United States Patent
Randall et al.

(10) Patent No.: US 8,975,324 B2
(45) Date of Patent: Mar. 10, 2015

(54) TREAD RUBBER COMPOUNDS HAVING IMPROVED ABRASION RESISTANCE USING FUNCTIONALIZED LIQUID POLYBUTADIENE

(75) Inventors: Amy M. Randall, Akron, OH (US); Sheel P. Agarwal, Solon, OH (US); William L. Hergenrother, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 13/879,855

(22) PCT Filed: Oct. 18, 2011

(86) PCT No.: PCT/US2011/056677
§ 371 (c)(1),
(2), (4) Date: Apr. 17, 2013

(87) PCT Pub. No.: WO2012/054458
PCT Pub. Date: Apr. 26, 2012

(65) Prior Publication Data
US 2013/0203893 A1 Aug. 8, 2013

Related U.S. Application Data

(60) Provisional application No. 61/394,008, filed on Oct. 18, 2010.

(51) Int. Cl.
| | |
|---|---|
| *C08K 3/18* | (2006.01) |
| *C08J 3/22* | (2006.01) |
| *C08K 3/22* | (2006.01) |
| *B60C 1/00* | (2006.01) |
| *C08L 9/06* | (2006.01) |
| *C08L 21/00* | (2006.01) |
| *C08K 3/00* | (2006.01) |
| *C08L 13/00* | (2006.01) |
| *C08L 91/00* | (2006.01) |

(52) U.S. Cl.
CPC .............. *C08K 3/22* (2013.01); *B60C 1/0016* (2013.01); *C08L 9/06* (2013.01); *C08L 21/00* (2013.01); *C08K 3/0016* (2013.01); *C08L 13/00* (2013.01); *C08L 91/00* (2013.01); *C08L 2207/324* (2013.01)
USPC .......................................... 524/432; 523/351

(58) Field of Classification Search
USPC ........................................................ 524/432
See application file for complete search history.

(56) References Cited

U.S. PATENT DOCUMENTS

| | | |
|---|---|---|
| 4,261,403 A | 4/1981 | Imai et al. |
| 5,151,142 A | 9/1992 | Imai et al. |
| 5,300,569 A | 4/1994 | Drake et al. |
| 5,334,665 A | 8/1994 | Lawson et al. |
| 5,430,095 A | 7/1995 | Ishiura et al. |
| 5,508,333 A | 4/1996 | Shimizu |
| 5,647,400 A | 7/1997 | Jani et al. |
| 5,990,210 A | 11/1999 | Wideman et al. |
| 6,070,634 A | 6/2000 | Sandstrom et al. |
| 6,186,204 B1 | 2/2001 | Sasaka et al. |
| 6,414,073 B1 | 7/2002 | Nakamura et al. |
| 6,426,378 B1 | 7/2002 | Lickes et al. |
| 6,437,205 B1 | 8/2002 | Miller et al. |
| 6,512,051 B2 | 1/2003 | Chino et al. |
| 6,695,734 B2 | 2/2004 | Hedberg et al. |
| 6,834,697 B2 | 12/2004 | Sandstrom |
| 7,141,622 B2 | 11/2006 | Bowen, III et al. |
| 2002/0128105 A1 | 9/2002 | Hedberg et al. |
| 2003/0127169 A1 | 7/2003 | Hergenrother et al. |
| 2003/0144401 A1* | 7/2003 | Ajbani et al. .................. 524/445 |
| 2004/0024093 A1* | 2/2004 | Weydert et al. .................. 524/47 |
| 2005/0250883 A1 | 11/2005 | Shibata et al. |
| 2006/0167160 A1 | 7/2006 | Nakagawa et al. |
| 2006/0167163 A1 | 7/2006 | Ohashi et al. |
| 2007/0149689 A1 | 6/2007 | Wang et al. |
| 2008/0110544 A1 | 5/2008 | Nakamura |

FOREIGN PATENT DOCUMENTS

| | | |
|---|---|---|
| EP | 1388567 A1 | 2/2004 |
| EP | 1514901 | 3/2005 |
| JP | 49086465 A | 8/1974 |
| JP | 55060539 | 5/1980 |

(Continued)

OTHER PUBLICATIONS

Baramboim, N.K. et al., "Mechanochemical Modification of Polybutadiene (SKB) by Maleic Anhydride," Rubber Chemistry and Technology, vol. 36, pp. 803-806 (1963).
Henning, Steven K., presentation, "Introduction to Sartomer's Liquid Polymer Products", pp. 1-24.
Sartomer Company, Inc., "Adhesion Promotion Using Maleated Liquid Polybutadiene Resins in Rubber Compounds", from http://www.sartomer.com/home.asp, pp. 1-14.
Kuraray Co., Ltd.; Brochure Liquid Rubber (2003).
Sartomer Sheets (2003).
Sartomer Tech Data Sheets (undated).
Written Opinion and Search Report for PCT/US2011/056677 dated May 2, 2013.

(Continued)

*Primary Examiner* — Hui Chin
(74) *Attorney, Agent, or Firm* — Meredith E. Hooker; Jenny L. Sheaffer

(57) ABSTRACT

A tread rubber composition having improved abrasion resistance is provided. The tread rubber composition comprises a conjugated diene polymer or copolymer, at least one filler, from 2 to 10 phr of liquid polybutadiene, from 2 to 5 phr of zinc oxide and from 1 to 100 phr of process oil. The liquid polybutadiene is functionalized by reaction with unsaturated acid anhydride, has a number average molecular weight of from 3 to 8 kg/mol and an acid number of from 40 to 80. Also provided are methods for preparing the tread rubber composition comprising mixing of the foregoing ingredients by master-batch and final batch steps whereby the abrasion resistance of the tread rubber composition is improved.

20 Claims, No Drawings

(56) References Cited

FOREIGN PATENT DOCUMENTS

| | | |
|---|---|---|
| JP | 57063338 | 4/1982 |
| JP | 57063338 A | 4/1982 |
| JP | 05214170 | 8/1993 |
| JP | 11130909 | 5/1995 |
| JP | 09136996 | 5/1997 |
| JP | 2000129037 | 5/2000 |
| JP | 2001114934 A | 4/2001 |
| JP | 2002155164 A | 5/2002 |
| JP | 2002155165 | 5/2002 |
| JP | 2005008824 A | 1/2005 |
| JP | 2005023144 A | 1/2005 |
| JP | 2005029548 A | 2/2005 |
| JP | 2005232354 A | 9/2005 |
| JP | 2006131384 A | 5/2006 |
| JP | 2006131681 A | 5/2006 |
| JP | 2006131684 | 5/2006 |
| JP | 2008297449 A | 12/2008 |
| WO | 2004026954 A1 | 4/2004 |
| WO | 2008135061 A1 | 11/2008 |

OTHER PUBLICATIONS

English Translation of First Chinese Office Action for Application No. 201180055744.8, dated Jun. 5, 2014.
European Office Action for Application No. 11781902.9, dated Aug. 4, 2014.
Ricon Resins High Performance Polymer Additives data sheet, dated Feb. 2010.
Product Detail for Ricobond 1731 polybutadiene resin, printed Jun. 2008.
Ricobond 1031 description, downloaded Feb. 2009.
Ricobond 1731 description, downloaded Feb. 2009.
Ricobond 1756 description, downloaded Feb. 2009.
Ricobond 2031 description, downloaded Feb. 2009.
Response to EPO in Application No. 11781902.9, dated Dec. 30, 2013.

\* cited by examiner

TREAD RUBBER COMPOUNDS HAVING IMPROVED ABRASION RESISTANCE USING FUNCTIONALIZED LIQUID POLYBUTADIENE

CROSS-REFERENCE TO RELATED APPLICATION

This application claims priority to and any other benefit of U.S. Provisional Patent Application Ser. No. 61/394,008 filed Oct. 18, 2010 and entitled "TREAD RUBBER COMPOUNDS HAVING IMPROVED ABRASION RESISTANCE USING FUNCTIONALIZED LIQUID POLYBUTADIENE," the entire disclosure of which is incorporated by reference herein.

FIELD

One or more embodiments disclosed herein relate to a tread rubber compound having a cross-linker component that improves abrasion resistance properties of the compound, without significantly detracting from other useful properties.

BACKGROUND

In certain applications, it is advantageous for tread rubber compounds to exhibit improved abrasion resistance. Yet, it is desirable to improve abrasion resistance without significantly impacting other useful properties of the tread rubber compound, such as cure, functionality of the matrix polymer, and the elastic modulus of the compound.

It is also generally advantageous to reduce the amount of process oil utilized in a tread rubber formulation without negatively impacting useful properties of the tread rubber compound, such as processability.

SUMMARY

The present application describes a tread rubber compound that utilizes functionalized liquid polybutadiene to provide improved abrasion resistance.

In one embodiment, a tread rubber compound is disclosed having improved abrasion resistance, comprising a conjugated diene polymer or copolymer, at least one filler, from 2 to 10 parts by weight per hundred parts by weight rubber (phr) of liquid polybutadiene, from 0.2 to 5 phr of zinc oxide, and from 1 to 100 phr of process oil. The liquid polybutadiene is functionalized by the reaction with an unsaturated acid anhydride, and has a number average molecular weight of from 3 to 8 kg/mol and an acid number of from 40 to 180. Notably, unless otherwise stated, all molecular weights herein are determined by gel permeation/size exclusion chromatography (SEC) using a Waters GPC system with universal calibration using a monodisperse polystyrene standard, and are calculated using Mark-Houwink constants.

In another embodiment, a method of improving the abrasion resistance of a tread rubber composition is disclosed. A master-batch is mixed comprising a conjugated diene polymer or copolymer, at least one filler, from 2 to 10 phr liquid polybutadiene, from 0 to 5 phr zinc oxide, and from 1 to 100 phr of process oil (the liquid polybutadiene having previously been functionalized by the reaction with an unsaturated acid anhydride, and having a number average molecular weight of from 3 to 8 kg/mol, and an acid number of from 40 to 180). In a later step, a final batch is mixed comprising the master batch, at least one curative, and from 0 to 5 phr zinc oxide. Finally, the final batch is vulcanized. Overall, the total amount of zinc oxide (i.e., the sum of any amount used in the master batch with any amount used in the final batch) is from 0.2 to 5 phr.

Other aspects of this disclosure will be apparent to the ordinarily skilled artisan from the description of various embodiments that follows. In that description, the following definitions apply throughout unless the surrounding text explicitly indicates a contrary intention:

"acid number" means the mass of potassium hydroxide, in milligrams, that is required to neutralize one gram of the substance in question;

"improved abrasion resistance" and "improved wear properties" and "improved wear resistance" are used interchangeably herein and mean, with reference to the Lambourn testing protocol described in the examples below, exhibiting at least a 5% increase in the Lambourn Abrasion Index.

"liquid polymer" is a polymer that is liquid at room temperature (i.e., at 25° C. or 70° F.);

"polymer" means the polymerization product of one or more monomers and is inclusive of homo- and inter-polymers, and random, block, segmented, graft, etc., polymers, and the like.

Throughout this document, all values given in the form of percentages are weight percentages unless the surrounding text explicitly indicates a contrary intention. The relevant portions of any patent or patent publication mentioned is incorporated herein by reference.

DETAILED DESCRIPTION

Generally, according to one or more embodiments described herein, tread rubber compositions are disclosed having improved abrasion resistance. The tread rubber compositions described herein comprise conjugated diene polymer or copolymer, at least one filler, from 0.2 to 5 phr of zinc oxide, from 2 to 10 phr liquid polybutadiene that has been functionalized with unsaturated acid anhydride and from 1 to 100 phr of process oil. Without wishing to be bound by theory, it is believed that the functionalized liquid polybutadiene associates with zinc oxide to provide long, stable crosslinks. In one or more embodiments, the functionalized liquid polybutadiene also serves as a partial replacement for process oil. Advantageously, the addition of functionalized liquid polybutadiene and zinc oxide in certain amounts has been found to have slight impact on other properties of the tread rubber composition, including but not limited to the physical properties discussed in the examples below.

Generally, any rubbery conjugated diene polymer or copolymer that is suitable for use in tread rubber compounds, and mixtures thereof, may be used in the tread rubber compositions disclosed herein. In one or more embodiments, suitable conjugated diene polymer is a polymer obtained by polymerizing a conjugated diene monomer having from 4 to 12 carbon atoms. Non-limiting examples include 1,3-butadiene, isoprene, 2,3-dimethyl-1,3-butadiene, 1,3-pentadiene, octadiene, and the like. The conjugated diene monomer may be used singly or as a mixture of two or more types. Among these monomers, 1,3-butadiene is particularly preferable.

In one or more embodiments, suitable copolymers are copolymers obtained by polymerization of one or more of the aforementioned conjugated diene monomers and one or more vinyl aromatic hydrocarbon monomers. Non-limiting examples of vinyl aromatic hydrocarbon monomer include styrene, α-methylstyrene, p-methylstyrene, o-methylstyrene, p-butylstyrene, vinylnaphthalene, and the like. Among these vinyl aromatic hydrocarbon monomers, styrene is preferable.

In one more embodiments, the conjugated diene polymer or copolymer is styrene butadiene rubber, polybutadiene, cis-1,4-polybutadiene, butadiene-isoprene rubber, natural rubber, synthetic cis-1,4-polyisoprene, styrene-isoprene rubber, styrene-isoprene-butadiene rubber, and butyl rubber, terminal and backbone functionalized derivatives thereof, and mixtures thereof. In one non-limiting embodiment, the conjugated diene polymer is styrene butadiene rubber having a weight ratio of conjugated diene units to vinyl aromatic units of between 45/55 to 95/5; in another embodiment between 55/45 to 85/15; in another between 65/35 to 75/25. The distribution of the units in the copolymer may be a random distribution, a block distribution, or an intermediate distribution. A random distribution and an intermediate distribution are generally preferable.

The microstructure (cis-1,4, trans-1,4, and 1,2 vinyl) of the diene portion of the conjugated diene polymer or copolymer is not particularly limited, and a person of ordinary skill in the art will know how to adjust the microstructure as needed. For example, diene polymers can generally be prepared by polymerizing the diene monomer in a hydrocarbon solvent such as hexane in the presence of an organoalkali-metal initiator such as butyllithium and an appropriate polar modifier such as an ether or amine. Especially useful polar modifiers are ethers such as diglyme, triglyme, tetraglyme, tetrahydrofuran and the like, and diamines such as N,N,N'N'-tetramethylene diamine, dipiperidino ethane and the like. The specific 1,2-microstructure content obtained is dependent on a number of factors including the specific type of initiator, the type of modifier, the modifier to initiator ratio and the polymerization temperature. Illustrative methods of preparing diene polymers having 1,2-microstructure contents ranging from 10 to 90% or more are described in numerous patents and publications, including U.S. Pat. No. 4,264,753, the disclosure of which is incorporated herein by reference. In another illustrative example, the conjugated diene polymer or copolymer includes ultra high-cis polybutadiene rubber. Catalyst systems suitable for obtaining such material include transition or lanthanide metal catalyst systems, known in the art, such as, for example, the catalyst system disclosed in U.S. Pat. No. 6,437,205, the disclosure of which is incorporated herein by reference.

The weight average molecular weight of the conjugated diene polymer is between 100 and 3,000 kg/mol. In one or more embodiments, the conjugated diene polymer has a weight average molecular weight between 200 and 2,000 kg/mol; in others, between 220 and 1,750 kg/mol.

The tread rubber compositions described herein also include between 2 and 10 phr of functionalized liquid polybutadiene polymer. The functionalized liquid polybutadiene advantageously acts as a softening agent and thereby acts to replace a portion of process oil, described below, in the tread rubber composition. In one or more embodiments, the tread rubber composition includes between 2 and 9 phr functionalized liquid polybutadiene; in other, between 2 and 8 phr.

In general, the microstructure (i.e., cis, trans and vinyl content) of the functionalized liquid polybutadiene is not limited. The number average molecular weight of the functionalized liquid polybutadiene is from 2 to 10 kg/mol. In one or more embodiments, the number average molecular weight is from 3 to 8 kg/mol; in others, from 3 to 6 kg/mol.

The liquid polybutadiene is functionalized by reaction with an unsaturated acid anhydride. Functionalizing a liquid polymer using unsaturated acid anhydride is generally known to those skilled in the art, and the liquid polybutadienes useful in the embodiments described herein are not limited by the manner of such reaction. The liquid polybutadiene may be functionalized by polymerizing butadiene in the presence of an unsaturated acid anhydride, such that acid anhydride is incorporated along the backbone of the polybutadiene chains. Alternatively, the liquid polybutadiene may be reacted with the unsaturated acid anhydride post-polymerization at elevated temperatures such that acid anhydride moieties are grafted onto the backbone of the polybutadiene chains. In one embodiment described herein, the unsaturated acid anhydride randomly functionalizes the liquid polybutadiene chain.

Generally any suitable unsaturated acid anhydride may be utilized in the compositions disclosed herein. In certain embodiments, the unsaturated acid anhydride is itaconic, citraconic, or maleic anhydride, or mixtures thereof. Preferably, the unsaturated acid anhydride is maleic anhydride.

The acid number of the functionalized liquid polybutadiene indicates the relative degree of functionalization provided by the reaction of the liquid polybutadiene with unsaturated acid anhydride. In general, a relatively high acid number (i.e., a high level of functionality) results in a relatively high degree of crosslinking in the rubber composition incorporating the functionalized liquid polybutadiene, provided that sufficient zinc oxide is available to coordinate with the anhydride moieties. Note, however, that processability of the rubber composition decreases when the acid number of the functionalized liquid polybutadiene is increased.

The functionalized liquid polybutadiene used in the tread compositions disclosed herein has an acid number between 40 and 180. In certain embodiments, the functionalized liquid polybutadiene has an acid number between 60 and 160; in others, between 80 and 140; in still others, between 90 and 120.

As described herein, the addition of zinc oxide to the tread rubber composition of the present application is believed to cause formation of crosslinks by association with a portion of the anhydride moieties present in the functionalized liquid polybutadiene. Generally, from 0.2 to 5 phr zinc oxide is present in the tread rubber compositions. In certain embodiments, from 2 to 5 phr zinc oxide is present; in others, from 3 to 5 phr zinc oxide, and in yet others 4 phr zinc oxide is present. Additionally, the weight ratio of functionalized liquid polybutadiene to zinc oxide present in the tread rubber compositions described herein is less than 10/3. In certain embodiments, the ratio is between 8/3 and 1/2; in others, between 2.5/1 and 1/1.

Generally, any filler(s) conventionally used to prepare tread rubber compositions may be used in the compositions described herein. Potentially useful fillers are well known to those of skill in the art and include carbon black, fumed or precipitated silica, clay, metal oxide, metal hydroxide, metal sulfide, metal silicate, metal carbonate, dual phase or multiphase composite particles, or combinations thereof. Other potentially useful fillers are disclosed in e.g., WO 2009086490.

Depending on the application and on the density of the filler particles, the tread rubber compositions described herein are generally filled to a combined amount of filler between 2 and 300 phr. In one or more embodiments, the tread rubber compounds may be filled with between 5 and 200 phr of filler(s); in others, between 30 and 160 phr; in still others, between 40 and 120 phr.

Other conventional rubber additives may also be added. These include, for example, process oils, plasticizers, antidegradants such as antioxidants and anti-ozonants, curing agents and the like.

Typically, process oils are added to tread rubber compositions as a softener. Non-limiting examples of process oils used in the tread rubber compositions disclosed herein include paraffinic, naphthenic, and aromatic process oils, and the like. In one or more embodiments, the process oil is an aromatic process oil. In other embodiments, the process oil is a low polycyclic aromatic content ("low PCA") oil containing less than 2%. Other useful oils include those containing less than 3 wt %, less than 2 wt % or less than 1 wt % of polycyclic aromatic compounds (as measured by IP346) ("low PCA oils"). Such low PCA oils are increasingly used in an effort to reduce the amount of polycyclic aromatic compounds present in rubbers used in tires. Commercially available low PCA oils include various naphthenic oils, mild extraction solvates (MES) and treated distillate aromatic extracts (TDAE).

Generally, the tread rubber compositions disclosed herein contain between 1 and 100 phr process oil. In one or more embodiments, the amount of process oil is between 2 and 100 phr; in other embodiments, between 1 and 50 phr; in others, between 2 and 50 phr. In still other embodiments, the amount of process oil is between 1 and 20 phr; in others, between 2 and 20 phr; in others, between 1 and 10 phr; in still others, between 2 and 10 phr.

When forming the tread rubber composition, generally all ingredients may be mixed with standard equipment such as, e.g., Banbury or Brabender mixers. Typically, mixing occurs in two or more stages. During the first stage (also known as the masterbatch stage), mixing typically is begun at temperatures of about 100° to about 130° C. and increases until a so-called drop temperature, typically about 165° C., is reached.

Where a formulation includes fillers other than (or in addition to) carbon black, a separate re-mill stage often is employed for separate addition of the other fillers. This stage often is performed at temperatures similar to, although often slightly lower than, those employed in the masterbatch stage, i.e., ramping from about 90° C. to a drop temperature of about 150° C. For purposes of this application, the term "masterbatch" means the composition that is present during the masterbatch stage or the composition as it exists during any re-mill stage, or both.

Reinforced rubber compounds conventionally are cured with about 0.2 to about 5 phr of one or more known vulcanizing agents or curatives such as, for example, sulfur or peroxide-based curing systems. For a general disclosure of suitable curatives, see Kirk-Othmer, Encyclopedia of Chem. Tech., 3d ed., (Wiley Interscience, New York, 1982), vol. 20, pp. 365-468. Curatives, accelerators, etc., are generally added at a final mixing stage. To avoid undesirable scorching and/or premature onset of vulcanization, this mixing step often is done at lower temperatures, e.g., starting at about 60° to about 65° C. and not going higher than about 105° to about 110° C. For purposes of this application, the term "final batch" means the composition that is present during the final mixing stage.

Subsequently, the compounded mixture is processed (e.g., milled) into sheets prior to being formed into any of a variety of components and then vulcanized, which typically occurs at about 5° to about 15° C. higher than the highest temperatures employed during the mixing stages, most commonly about 170° C.

A method of improving abrasion resistance of a tread rubber composition is disclosed herein. Initially, a masterbatch is mixed comprising a conjugated diene polymer or copolymer, a filler, functionalized liquid polybutadiene, and process oil, all of which are previously described, and in the amounts previously described. Subsequently, a final batch is mixed comprising the masterbatch and at least one curative, as previously discussed. In addition, zinc oxide is added at one or more mixing stages during the process (i.e., during masterbatch stage and/or during the final batch stage), such that between 2 and 5 phr of zinc oxide in total is added to the composition. In one or more embodiments, between 3 and 5 phr of zinc oxide in total is added; in others, 4 phr is added. Later, the final batch is vulcanized.

The embodiments disclosed herein will be more readily understood by reference to the following examples. There are, of course, many other embodiments or illustrations which will become apparent to one skilled in the art, and it will accordingly be recognized that these examples are given for the purpose of illustration only, and are not to be construed as limiting the scope of the claims in any way.

EXAMPLES

Mooney viscosity (ML1+4) values are determined with an Alpha Technologies Mooney viscometer (with a large rotor) using a one-minute warm-up time (whereby the sample is preheated at 130° C. for 1 minute) and a four-minute running time (whereby the measurement is recorded as the torque after the rotor has rotated 4 minutes at 130° C.

Viscoelastic properties of cured rubber compounds are measured with an Advanced Rheometric Expansion System (ARES) from TA Instruments. The dynamic strain sweep testing is carried out in the parallel plate geometry with a rubber button of 7.8 mm in diameter and 6.0 mm in height. The loss modulus, G", storage modulus, G', and hysteresis tang are measured over deformation of 0.25-14% $\gamma_0$ (strain amplitude) at 10 Hz at 60° C.

Tensile mechanical properties are determined following the guidelines, but not restricted to, the standard procedure described in ASTM-D412, using micro dumbbell samples. Specimens are strained at a constant rate and the resulting force is recorded as a function of extension (strain). Force readings are expressed as engineering-stresses by reference to the original cross-sectional area of the test piece.

Cure is tested at 171° C. with a Monsanto rheometer MDR 2000 from Alpha Technologies. This test follows the guidelines of, but is not restricted to, ASTM-D 2084.

The Zwick rebound resilience tester measures Rebound Resilience. The specimen is strained by impacting the test piece with an indenter which is free to rebound after the impact. Rebound resilience is defined as the ratio of the stored energy before and after impact on the sample with the instrument pendulum arm.

Hardness measurement, as applied to rubber, is defined as a relative resistance of the surface to indentation by an indenter of specified dimensions under a specific load. Shore A hardness testing follows, but is not restricted to, the ASTM D 2240 standard. An Instron Model 902/2000 test system consisting of (1) Duro Operating Stand, (2) Durotronic 2000 Digital Durometer and (3) RS232 PC interface is used.

Abrasion resistance of rubber compounds as a tire wear performance indicator is measured using a Lambourn Abrasion Tester. A circular test specimen is placed on an axle and run at various slip angles and speeds against a driven abrasive surface. Talc powder is used as a lubricant. The test specimen is weighed before testing an after testing to determine the amount of material loss and a wear index is calculated using the average rate of material loss (typically using 3-5 data points).

Examples 1-12

Rubber compositions were prepared according to the formulations shown in Table 1, below, by selectively adding maleinated liquid polybutadiene as a partial replacement for oil and by varying the amount of zinc oxide. The functionalized liquid polybutadiene was Ricobond™ 1731, commercially available from the Sartomer Company, that is reported as having an acid number of between 91.6 and 103, a 1,2-vinyl microstructure of between 18 and 33% (molar), and a number average molecular weight of 5.5 kg/mol. In each example herein, the matrix rubber used was either SBR1 or SBR2—styrene butadiene rubbers having weight average molecular weights of 360 Kg/mol and 260 Kg/mol, and microstructures of 20% styrene and 63% vinyl and 24% styrene and 13% vinyl, respectively.

As shown in Table 3, below, the amount of bound rubber is consistent between the control and the experimental samples for each polymer showing that the addition of maleinated liquid polybutadiene did not interfere with the SBR interaction with filler, which is key when using functional polymers like SBR1. Also, the percent extracted before cure is consistent between the control and experimental samples indicating that most of the oil and maleinated liquid polybutadiene is removed, indicating that more of the oil and maleinated liquid polybutadiene can be extracted before curing. However, after

TABLE 1

| | Example No | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Master Batch: | | | | | | | | | | | | |
| SBR1 | 100 | 100 | 100 | 100 | 100 | 100 | 0 | 0 | 0 | 0 | 0 | 0 |
| SBR2 | 0 | 0 | 0 | 0 | 0 | 0 | 100 | 100 | 100 | 100 | 100 | 100 |
| Ricobond 1731 | 0 | 0 | 0 | 2 | 4 | 6 | 0 | 0 | 0 | 2 | 4 | 6 |
| CB[1] | 50 | 50 | 50 | 50 | 50 | 50 | 50 | 50 | 50 | 50 | 50 | 50 |
| Oil[2] | 10 | 10 | 10 | 8 | 6 | 4 | 10 | 10 | 10 | 8 | 6 | 4 |
| Stearic acid | 2 | 2 | 2 | 2 | 2 | 2 | 2 | 2 | 2 | 2 | 2 | 2 |
| Wax[3] | 2 | 2 | 2 | 2 | 2 | 2 | 2 | 2 | 2 | 2 | 2 | 2 |
| 6PPD[4] | 0.95 | 0.95 | 0.95 | 0.95 | 0.95 | 0.95 | 0.95 | 0.95 | 0.95 | 0.95 | 0.95 | 0.95 |
| ZnO[5] | 2 | 2.5 | 3 | 2.5 | 3 | 3.5 | 2 | 2.5 | 3 | 2.5 | 3 | 3.5 |
| Final Batch: | | | | | | | | | | | | |
| Sulfur | 1.3 | 1.5 | 1.7 | 1.5 | 1.5 | 1.5 | 1.3 | 1.5 | 1.7 | 1.5 | 1.5 | 1.5 |
| TBBS[6] | 0.4 | 0.5 | 0.6 | 0.5 | 0.5 | 0.5 | 0.4 | 0.5 | 0.6 | 0.5 | 0.5 | 0.5 |
| MBTS[7] | 0.4 | 0.5 | 0.6 | 0.5 | 0.5 | 0.5 | 0.4 | 0.5 | 0.6 | 0.5 | 0.5 | 0.5 |
| DPG[8] | 0.2 | 0.3 | 0.4 | 0.3 | 0.3 | 0.3 | 0.2 | 0.3 | 0.4 | 0.3 | 0.3 | 0.3 |
| Cure Conditions: | | | | | | | | | | | | |
| Temp. (° C.) | 171 | 171 | 171 | 171 | 171 | 171 | 171 | 171 | 171 | 171 | 171 | 171 |
| Time (min) | 15 | 15 | 15 | 20 | 20 | 20 | 10 | 10 | 10 | 15 | 20 | 20 |

[1]Carbon black N343, commercially available from Cabot Corp.
[2]Hyprene Oil, commercially available from Ergon Refining Inc.
[3]Okerin Wax, commercially available from Paramelt BV
[4]Santoflex 6PPD, commercially available from Flexsys
[5]Kadox, commercially available from Horsehead Corp.
[6]Santocure TBBS accelerator, commercially available from Flexsys
[7]Perkacit MBTS accelerator, commercially available from Flexsys
[8]Perkacit DPG accelerator, commercially available from Flexsys In each sample, a blend of the ingredients was mixed by a method listed in Table 2, below. The final stock was sheeted and cured according to the temperature and times listed in Table 1. The control samples (Comparative Examples) were Examples 1-3 for SBR1 and Examples 7-9 for SBR2. The control samples used 10 phr of oil and included various amounts of curatives. There were three cure states in the control samples where zinc oxide, sulfur, and accelerator amounts were varied in order to ensure that improvements in the experimental samples were not due to differences in the cure conditions.

TABLE 2

| | Time | Condition |
|---|---|---|
| Master Batch Stage (Initial Temp: 110° C.) | 0 min | charge polymers |
| | 0.5 min | charge oil and filler and other pigments |
| | 5.0 min | drop based on time or max temperature of 165° C. |
| Final Batch Stage (Initial Temp: 65° C.) | 0 sec | charge master batch |
| | 30 sec | charge curatives |
| | 75 sec | drop on mixing time or max temperature of 110° C. |

Mixer: 300 g Brabender
Agitation Speed: 60 rpm curing the percent extracted decreases for most of the experimental samples indicating that the maleinated liquid polybutadiene has cured into the rubber compound.

TABLE 3

| | AFTER CURE | BEFORE CURE | |
|---|---|---|---|
| Example No. | % Extracted (initial-dried)/initial | % Bound Rubber | % Extracted from Bound Rubber |
| 1 | 9.6 | 35.31 | 48.41 |
| 2 | 8.3 | 36.15 | 47.93 |
| 3 | 8.7 | 32.90 | 49.84 |
| 4 | 8.1 | 36.53 | 47.71 |
| 5 | 6.6 | 34.82 | 48.42 |
| 6 | 5.8 | 34.27 | 48.75 |
| 7 | 10 | 28.99 | 52.15 |
| 8 | 10.8 | 29.67 | 51.73 |
| 9 | 9.8 | 29.01 | 52.11 |
| 10 | 10 | 28.50 | 52.42 |
| 11 | 10.1 | 26.60 | 53.24 |
| 12 | 7.8 | 29.57 | 51.49 |

Physical properties of the vulcanized rubber compounds, such as the tensile strength, Mooney, cure time, and hysteresis loss (at 60° C.), are shown in Table 4, below.

TABLE 4

| | Example No | | | | | |
|---|---|---|---|---|---|---|
| | 1 | 2 | 3 | 4 | 5 | 6 |

| MULTIPOINT LAMBOURN ABRASION RESISTANCE (AGED 2 days at 100° C.) | | | | | | |
|---|---|---|---|---|---|---|
| Average Slope (g/s): | −0.0030 | −0.0032 | −0.0034 | −0.0030 | −0.0030 | −0.0029 |
| Lambourn Index: | 106 | 100 | 96 | 106 | 108 | 109 |
| MULTIPOINT LAMBOURN ABRASION RESISTANCE | | | | | | |
| Average Slope (g/s): | −0.0026 | −0.0028 | −0.0029 | −0.0027 | −0.0025 | −0.0025 |
| Lambourn Index: | 105 | 100 | 95 | 102 | 112 | 111 |
| STRAIN SWEEP (60° C., FINAL, ARES) | | | | | | |
| G' (MPa) @ 5%, 10 Hz: | 1.8917 | 1.9429 | 2.0773 | 2.2000 | 2.4728 | 2.6670 |
| G" (MPa) @ 5%, 10 Hz: | 0.2743 | 0.2668 | 0.2802 | 0.3096 | 0.3764 | 0.4189 |
| tanδ @ 5%, 10 Hz: | 0.1450 | 0.1373 | 0.1349 | 0.1407 | 0.1522 | 0.1571 |
| ΔG' (MPa) [0.25-14%], 10 Hz: | 0.8821 | 0.8484 | 1.0132 | 1.0465 | 1.4483 | 1.5507 |
| REBOUND RESILIANCE | | | | | | |
| Rebound (50 C.): | 56.4 | 56.8 | 58.2 | 57.4 | 57.2 | 56.2 |
| Rebound (23 C.): | 33.0 | 32.0 | 31.0 | 33.0 | 34.2 | 34.2 |
| SHORE A HARDNESS | | | | | | |
| Mean at (23 C.): | 59.1 | 61.3 | 62.2 | 61.7 | 63.2 | 65.26 |
| CURE RHEOMETER (171° C.) | | | | | | |
| ML (kg · cm): | 1.54 | 1.53 | 1.59 | 1.75 | 1.97 | 2.28 |
| MH (kg · cm): | 15.52 | 16.86 | 18.41 | 17.17 | 17.55 | 18.4 |
| t50 (min): | 3.79 | 2.86 | 2.29 | 2.96 | 4.34 | 5.4 |
| t90 (min): | 10.63 | 8.4 | 7.02 | 11.11 | 16.53 | 19.62 |
| MOONEY/SCORCH (130° C.) | | | | | | |
| Final, ML1 + 4: | 46.7 | 46.7 | 46.5 | 51.6 | 55.1 | 59.8 |
| t5 (min): | 18.63 | 15.25 | 12.08 | 15.73 | 17.38 | 18.03 |
| t35 (min): | 29.15 | 22.75 | 17.61 | 24.73 | 35.17 | 49.43 |
| TENSILE PROPERTIES (23° C.) | | | | | | |
| Peak Stress (MPa): | 23.00 | 23.00 | 21.40 | 21.60 | 20.80 | 18.90 |
| 100% Modulus (MPa): | 2.31 | 2.74 | 3.03 | 2.65 | 2.74 | 2.70 |
| 300% Modulus (MPa): | 11.11 | 13.44 | 14.80 | 12.35 | 11.28 | 10.22 |
| Elongation (%): | 532.1 | 466.6 | 404.1 | 465.3 | 492.9 | 495.9 |
| Toughness (MPa): | 53.58 | 47.35 | 37.42 | 43.76 | 46.00 | 43.36 |

| | Example No | | | | | |
|---|---|---|---|---|---|---|
| | 7 | 8 | 9 | 10 | 11 | 12 |

| MULTIPOINT LAMBOURN ABRASION RESISTANCE (AGED 2 days at 100° C.) | | | | | | |
|---|---|---|---|---|---|---|
| Average Slope (g/s): | −0.0019 | −0.0020 | −0.0022 | −0.0019 | −0.0018 | −0.0018 |
| Lambourn Index: | 105 | 100 | 93 | 108 | 112 | 113 |
| MULTIPOINT LAMBOURN ABRASION RESISTANCE | | | | | | |
| Average Slope (g/s): | −0.0015 | −0.0016 | −0.0015 | −0.0015 | −0.0014 | −0.0014 |
| Lambourn Index: | 104 | 100 | 101 | 103 | 112 | 112 |
| STRAIN SWEEP (60° C., FINAL, ARES) | | | | | | |
| G' (MPa) @ 5%, 10 Hz: | 2.1011 | 2.2182 | 2.4355 | 2.3750 | 2.6023 | 2.8281 |
| G" (MPa) @ 5%, 10 Hz: | 0.4626 | 0.4332 | 0.4206 | 0.5809 | 0.6911 | 0.7823 |
| tanδ @ 5%, 10 Hz: | 0.2202 | 0.1953 | 0.1727 | 0.2446 | 0.2656 | 0.2766 |
| ΔG' (MPa) [0.25-14%], 10 Hz: | 1.4846 | 1.5156 | 1.7142 | 2.1142 | 2.6680 | 3.1758 |
| REBOUND RESILIANCE | | | | | | |
| Rebound (50 C.): | 53 | 55.6 | 58.2 | 50.8 | 49.4 | 48 |
| Rebound (23 C.): | 50.4 | 51.2 | 52.8 | 49.4 | 49.2 | 48 |
| SHORE A HARDNESS | | | | | | |
| Mean at (23 C.): | 56.76 | 59.74 | 62.54 | 59.02 | 60.92 | 62.32 |
| CURE RHEOMETER (171° C.) | | | | | | |
| ML (kg · cm): | 2.33 | 2.26 | 2.18 | 2.4 | 2.63 | 2.74 |
| MH (kg · cm): | 12.3 | 14.98 | 17.11 | 12.38 | 12.48 | 12.59 |
| t50 (min): | 2.34 | 2 | 1.73 | 2.78 | 3.74 | 4.48 |
| t90 (min): | 4.43 | 3.34 | 2.73 | 8.1 | 15.59 | 18.82 |

TABLE 4-continued

| MOONEY/SCORCH (130° C.) | | | | | | |
|---|---|---|---|---|---|---|
| Final, ML1 + 4: | 48.2 | 47.2 | 46.5 | 52.3 | 55.5 | 59 |
| t5 (min): | 17.33 | 14.4 | 12.05 | 18.15 | 21.33 | 22.47 |
| t35 (min): | 23.29 | 19.29 | 16.04 | 23.64 | 43.55 | 59.32 |
| TENSILE PROPERTIES (23° C.) | | | | | | |
| Peak Stress (MPa): | 20.10 | 22.80 | 23.40 | 18.40 | 15.80 | 14.20 |
| 100% Modulus (MPa): | 1.56 | 1.99 | 2.40 | 1.64 | 1.66 | 1.90 |
| 300% Modulus (MPa): | 6.88 | 9.32 | 11.82 | 6.42 | 5.93 | 5.99 |
| Elongation (%): | 656.3 | 582.3 | 504.2 | 679.1 | 678.3 | 647.4 |
| Toughness (MPa): | 57.21 | 57.37 | 50.65 | 56.09 | 50.27 | 44.63 |

As can be seen in Table 4, the most noticeable improvements are that the test compounds show improved abrasion resistance, compared to the control specimens. There was as much as a 13% improvement by adding 6 phr of Ricobond™ 1731 to the formulation. In addition, the abrasion resistance persisted after aging of the samples for 2 days at 100° C.

Examples 13-24

Rubber compositions were prepared according to the formulation shown in Table 5, below, by selectively adding maleinated liquid polybutadiene as a partial replacement for oil and by using a relatively high amount of zinc oxide. The maleinated liquid polybutadiene was Ricobond™ 2031, commercially available from the Sartomer Company, that is reported as having an acid number of between 108.5 and 120, a 1,2-vinyl microstructure of between 18 and 33% (molar), and a number average molecular weight of 7.5 kg/mol.

As before, for each sample, a blend of the ingredients was mixed by a method listed in Table 2, above. The final stock was sheeted and cured according to the temperature and times listed in Table 5. The control samples were Examples 13-15 for SBR1 and Examples 19-21 for SBR2. The control samples used 10 phr of oil.

As shown in Table 6, below, the amount of bound rubber is consistent between the control and the experimental samples for each polymer showing that the addition of Ricobond™ 2031 did not interfere with the SBR interaction with filler, which is key when using functional polymers like SBR1. After curing the percent Ricobond™ extracted decreases for most of the experimental samples indicating that the Ricobond™ 2031 has cured into the rubber compound.

TABLE 5

| | Example No | | | | | | | | | | | |
|---|---|---|---|---|---|---|---|---|---|---|---|---|
| | 13 | 14 | 15 | 16 | 17 | 18 | 19 | 20 | 21 | 22 | 23 | 24 |
| Master Batch: | | | | | | | | | | | | |
| SBR1 | 100 | 100 | 100 | 100 | 100 | 100 | 0 | 0 | 0 | 0 | 0 | 0 |
| SBR2 | 0 | 0 | 0 | 0 | 0 | 0 | 100 | 100 | 100 | 100 | 100 | 100 |
| Ricobond 2031 | 0 | 0 | 0 | 2 | 4 | 6 | 0 | 0 | 0 | 2 | 4 | 6 |
| CB[1] | 50 | 50 | 50 | 50 | 50 | 50 | 50 | 50 | 50 | 50 | 50 | 50 |
| Oil[2] | 10 | 10 | 10 | 8 | 6 | 4 | 10 | 10 | 10 | 8 | 6 | 4 |
| Stearic acid | 2 | 2 | 2 | 2 | 2 | 2 | 2 | 2 | 2 | 2 | 2 | 2 |
| Wax[3] | 2 | 2 | 2 | 2 | 2 | 2 | 2 | 2 | 2 | 2 | 2 | 2 |
| 6PPD[4] | 0.95 | 0.95 | 0.95 | 0.95 | 0.95 | 0.95 | 0.95 | 0.95 | 0.95 | 0.95 | 0.95 | 0.95 |
| ZnO[5] | 2.5 | 3.0 | 3.5 | 3.5 | 3.5 | 3.5 | 2.5 | 3.0 | 3.5 | 3.5 | 3.5 | 3.5 |
| Final Batch: | | | | | | | | | | | | |
| Sulfur | 1.5 | 1.5 | 1.5 | 1.5 | 1.5 | 1.5 | 1.5 | 1.5 | 1.5 | 1.5 | 1.5 | 1.5 |
| TBBS[6] | 0.5 | 0.5 | 0.5 | 0.5 | 0.5 | 0.5 | 0.5 | 0.5 | 0.5 | 0.5 | 0.5 | 0.5 |
| MBTS[7] | 0.5 | 0.5 | 0.5 | 0.5 | 0.5 | 0.5 | 0.5 | 0.5 | 0.5 | 0.5 | 0.5 | 0.5 |
| DPG[8] | 0.3 | 0.3 | 0.3 | 0.3 | 0.3 | 0.3 | 0.3 | 0.3 | 0.3 | 0.3 | 0.3 | 0.3 |
| Cure Conditions: | | | | | | | | | | | | |
| Temperature (° C.) | 171 | 171 | 171 | 171 | 171 | 171 | 171 | 171 | 171 | 171 | 171 | 171 |
| Time (min) | 15 | 15 | 15 | 20 | 20 | 20 | 10 | 10 | 10 | 15 | 20 | 20 |

[1]Carbon black N343, commercially available from Cabot Corp.
[2]Hyprene Oil, commercially available from Ergon Refining Inc.
[3]Okerin Wax, commercially available from Paramelt BV
[4]Santoflex 6PPD, commercially available from Flexsys
[5]Kadox, commercially available from Horsehead Corp.
[6]Santocure TBBS accelerator, commercially available from Flexsys
[7]Perkacit MBTS accelerator, commercially available from Flexsys
[8]Perkacit DPG accelerator, commercially available from Flexsys

TABLE 6

| Example No. | AFTER CURE % Extracted (initial-dried)/initial | BEFORE CURE % Bound Rubber | % Extracted from Bound Rubber |
|---|---|---|---|
| 13 | 6.19 | 32.66 | 49.98 |
| 14 | 5.84 | 29.87 | 51.32 |
| 15 | 6.20 | 28.89 | 51.89 |
| 16 | 4.96 | 30.54 | 50.93 |
| 17 | 3.86 | 35.00 | 48.32 |
| 18 | 2.52 | 33.73 | 49.06 |
| 19 | 8.32 | 29.27 | 51.97 |
| 20 | 8.41 | 26.80 | 53.13 |
| 21 | 8.26 | 27.53 | 52.68 |
| 22 | 7.55 | 28.20 | 52.29 |
| 23 | 7.81 | 27.75 | 52.55 |
| 24 | 7.23 | 27.03 | 52.97 |
| 25 | 5.80 | 35.33 | 48.41 |
| 26 | 5.60 | 36.12 | 47.53 |
| 27 | 5.60 | 35.38 | 47.13 |
| 28 | 0.66 | 35.76 | 48.16 |
| 29 | 0.24 | 36.57 | 47.26 |
| 30 | 0.24 | 37.54 | 45.90 |
| 31 | 0.41 | 39.78 | 45.80 |
| 32 | 0.39 | 39.20 | 45.73 |
| 33 | 0.35 | 39.15 | 44.98 |

Physical properties of the vulcanizates are shown in Table 7, below.

TABLE 7

| | Example No | | | | | |
|---|---|---|---|---|---|---|
| | 13 | 14 | 15 | 16 | 17 | 18 |
| MULTIPOINT LAMBOURN ABRASION RESISTANCE (AGED 2 days at 100° C.) | | | | | | |
| Average Slope (g/s): | −0.0027 | −0.0028 | −0.0028 | −0.0027 | −0.0026 | −0.0025 |
| Lambourn Index: | 102 | 100 | 100 | 101 | 106 | 110 |
| MULTIPOINT LAMBOURN ABRASION RESISTANCE | | | | | | |
| Average Slope (g/s): | −0.0038 | −0.0038 | −0.0037 | −0.0036 | −0.0035 | −0.0033 |
| Lambourn Index: | 100 | 100 | 102 | 105 | 110 | 117 |
| STRAIN SWEEP (60° C., FINAL, ARES) | | | | | | |
| G' (MPa) @ 5%, 10 Hz: | 2.2939 | 2.2321 | 2.1789 | 2.5055 | 2.7791 | 3.3133 |
| G'' (MPa) @ 5%, 10 Hz: | 0.3299 | 0.3195 | 0.3055 | 0.3544 | 0.4073 | 0.5123 |
| tanδ @ 5%, 10 Hz: | 0.1438 | 0.1432 | 0.1402 | 0.1415 | 0.1466 | 0.1546 |
| ΔG' (MPa) [0.25-14%], 10 Hz: | 1.2600 | 1.1621 | 1.0593 | 1.3622 | 1.5386 | 2.2013 |
| REBOUND RESILIANCE | | | | | | |
| Rebound (23 C.): | 32.4 | 32.2 | 32.2 | 32.8 | 33.4 | 34 |
| Rebound (50 C.): | 56.6 | 56.0 | 56.4 | 56.8 | 56.2 | 55 |
| SHORE A HARDNESS | | | | | | |
| Mean at (23 C.): | 62.8 | 63.4 | 62.4 | 64.7 | 65.84 | 67.08 |
| CURE RHEOMETER (171° C.) | | | | | | |
| ML (kg · cm): | 1.39 | 1.42 | 1.38 | 1.61 | 1.65 | 1.82 |
| MH (kg · cm): | 15.02 | 15.21 | 15.08 | 15.51 | 15.54 | 16.2 |
| t50 (min): | 2.62 | 2.62 | 2.64 | 2.96 | 4.46 | 5.6 |
| t90 (min): | 7.49 | 7.61 | 7.58 | 10.68 | 16.82 | 19.99 |
| MOONEY/SCORCH (130° C.) | | | | | | |
| Final, ML1 + 4: | 50.4 | 50.2 | 49.6 | 55.8 | 60 | 63.2 |
| T80 (s): | 1.81 | 1.9 | 1.94 | 2.13 | 2.23 | 2.22 |
| TENSILE PROPERTIES (23° C.) | | | | | | |
| Peak Stress (MPa): | 19.40 | 20.50 | 19.50 | 19.40 | 19.30 | 17.60 |
| 100% Modulus (MPa): | 2.17 | 2.18 | 2.19 | 2.35 | 2.39 | 2.43 |
| 300% Modulus (MPa): | 8.74 | 8.69 | 8.70 | 9.11 | 7.97 | 7.25 |
| Elongation (%): | 570.71 | 603.92 | 573.52 | 561.15 | 629.17 | 639.82 |
| Toughness (MPa): | 49.66 | 56.05 | 50.17 | 49.56 | 56.19 | 53.00 |

| | Example No | | | | | |
|---|---|---|---|---|---|---|
| | 19 | 20 | 21 | 22 | 23 | 24 |
| MULTIPOINT LAMBOURN ABRASION RESISTANCE (AGED 2 days at 100° C.) | | | | | | |
| Average Slope (g/s): | −0.0016 | −0.0016 | −0.0016 | −0.0015 | — | — |
| Lambourn Index: | 103 | 100 | 99 | 111 | — | — |
| MULTIPOINT LAMBOURN ABRASION RESISTANCE | | | | | | |
| Average Slope (g/s): | −0.0025 | −0.0026 | −0.0025 | −0.0023 | −0.0022 | −0.0022 |
| Lambourn Index: | 103 | 100 | 102 | 113 | 116 | 118 |

TABLE 7-continued

| STRAIN SWEEP (60° C., FINAL, ARES) | | | | | | |
|---|---|---|---|---|---|---|
| G' (MPa) @ 5%, 10 Hz: | 2.4552 | 2.4145 | 2.3420 | 2.6890 | 3.1772 | 3.1760 |
| G" (MPa) @ 5%, 10 Hz: | 0.4755 | 0.4760 | 0.4601 | 0.5989 | 0.7829 | 0.8373 |
| tanδ @ 5%, 10 Hz: | 0.1937 | 0.1971 | 0.1964 | 0.2227 | 0.2464 | 0.2636 |
| ΔG' (MPa) [0.25-14%], 10 Hz: | 1.7606 | 1.8328 | 1.7604 | 2.2777 | 3.2212 | 3.4362 |
| REBOUND RESILIANCE | | | | | | |
| Rebound (23 C.): | 51.4 | 51.2 | 51.6 | 49.4 | 48.4 | 48.6 |
| Rebound (50 C.): | 56.8 | 56 | 56.8 | 51.4 | 49.4 | 48.6 |
| SHORE A HARDNESS | | | | | | |
| Mean at (23 C.): | 60.56 | 60.2 | 60.1 | 60.18 | 60.94 | 63.9 |
| CURE RHEOMETER (171° C.) | | | | | | |
| ML (kg · cm): | 1.9 | 1.98 | 1.94 | 2.2 | 2.39 | 2.46 |
| MH (kg · cm): | 12.93 | 13.15 | 13.03 | 10.81 | 10.72 | 10.52 |
| t50 (min): | 1.96 | 2.08 | 2.04 | 2.7 | 3.76 | 4.48 |
| t90 (min): | 3.3 | 3.65 | 3.44 | 6.77 | 16.02 | 19.89 |
| MOONEY/SCORCH (130° C.) | | | | | | |
| Final, ML1 + 4: | 49.3 | 49.4 | 48.5 | 54.9 | 58.8 | 62.8 |
| T80 (s): | 6.88 | 7.24 | 7 | 7.24 | 8.08 | 8.48 |
| TENSILE PROPERTIES (23° C.) | | | | | | |
| Peak Stress (MPa): | 19.60 | 21.20 | 20.90 | 17.10 | 11.20 | 10.40 |
| 100% Modulus (MPa): | 1.48 | 1.67 | 1.63 | 1.51 | 1.44 | 1.62 |
| 300% Modulus (MPa): | 6.20 | 6.40 | 6.25 | 5.09 | 3.88 | 3.97 |
| Elongation (%): | 700.86 | 751.92 | 747.62 | 775.82 | 783.00 | 757.49 |
| Toughness (MPa): | 60.47 | 71.01 | 69.41 | 59.96 | 43.36 | 40.11 |

As shown in Table 7, the most noticeable improvements are that the test compounds show improved wear resistance comparable to the control specimens especially after aging of the samples for 2 days at 100° C. There was as much as 18% improvement by adding 6 phr of Ricobond™ into the formulation.

Examples 25-33

Rubber compositions were prepared according to the formulation shown in Table 8, below. In these examples, maleinated liquid polybutabutadiene (Ricobond™ 1731) is compared with maleinated liquid isoprene, (LIR 403, available commercially from Kuraray Co. of Japan), and a relatively higher level of zinc oxide is used. The maleinated liquid polyisoprene has an acid number of about 0.24 and a molecular weight of 25 kg/mol.

TABLE 8

| | Example No. | | | | | | | | |
|---|---|---|---|---|---|---|---|---|---|
| | 25 | 26 | 27 | 28 | 29 | 30 | 31 | 32 | 33 |
| Master Batch: | | | | | | | | | |
| SBR1 | 100 | 100 | 100 | 100 | 100 | 100 | 100 | 100 | 100 |
| Ricobond 1731 | 0 | 0 | 0 | 10 | 10 | 10 | 0 | 0 | 0 |
| LIR403 | 0 | 0 | 0 | 0 | 0 | 0 | 10 | 10 | 10 |
| CB[1] | 50 | 50 | 50 | 50 | 50 | 50 | 50 | 50 | 50 |
| Oil[2] | 10 | 10 | 10 | 0 | 0 | 0 | 0 | 0 | 0 |
| Stearic acid | 2 | 2 | 2 | 2 | 2 | 2 | 2 | 2 | 2 |
| Wax[3] | 2 | 2 | 2 | 2 | 2 | 2 | 2 | 2 | 2 |
| 6PPD[4] | 0.95 | 0.95 | 0.95 | 0.95 | 0.95 | 0.95 | 0.95 | 0.95 | 0.95 |
| ZnO[5] | 2.5 | 4.0 | 7.0 | 2.5 | 4.0 | 7.0 | 2.5 | 4.0 | 7.0 |

TABLE 8-continued

|  | Example No. | | | | | | | | |
| --- | --- | --- | --- | --- | --- | --- | --- | --- | --- |
|  | 25 | 26 | 27 | 28 | 29 | 30 | 31 | 32 | 33 |
| Final Batch: | | | | | | | | | |
| Sulfur | 1.5 | 1.5 | 1.5 | 1.5 | 1.5 | 1.5 | 1.5 | 1.5 | 1.5 |
| TBBS[6] | 0.5 | 0.5 | 0.5 | 0.5 | 0.5 | 0.5 | 0.5 | 0.5 | 0.5 |
| MBTS[7] | 0.5 | 0.5 | 0.5 | 0.5 | 0.5 | 0.5 | 0.5 | 0.5 | 0.5 |
| DPG[8] | 0.3 | 0.3 | 0.3 | 0.3 | 0.3 | 0.3 | 0.3 | 0.3 | 0.3 |
| Cure Conditions: | | | | | | | | | |
| Temperature (° C.) | 171 | 171 | 171 | 171 | 171 | 171 | 171 | 171 | 171 |
| Time (min) | 15 | 15 | 15 | 25 | 25 | 25 | 15 | 15 | 15 |

[1]Carbon black N343, commercially available from Cabot Corp.
[2]Hyprene Oil, commercially available from Ergon Refining Inc.
[3]Okerin Wax, commercially available from Paramelt BV
[4]Santoflex 6PPD, commercially available from Flexsys
[5]Kadox, commercially available from Horsehead Corp.
[6]Santocure TBBS accelerator, commercially available from Flexsys
[7]Perkacit MBTS accelerator, commercially available from Flexsys
[8]Perkacit DPG accelerator, commercially available from Flexsys As before, for each sample, a blend of the ingredients was mixed by a method listed in Table 2, above. The final stock was sheeted and cured according to the temperature and times listed in Table 8. The control samples were Examples 25-27, which used 10 phr of oil.

Physical properties of the vulcanizates is shown in Table 9, below.

TABLE 9

|  | Example No. | | | | | | | | |
| --- | --- | --- | --- | --- | --- | --- | --- | --- | --- |
|  | 25 | 26 | 27 | 28 | 29 | 30 | 31 | 32 | 33 |
| LAMBOURN ABRASION RESISTANCE (AGED 2 days at 100° C.) | | | | | | | | | |
| Average Slope (g/s): | −0.0032 | −0.0033 | −0.0033 | −0.0028 | −0.0030 | −0.0030 | −0.0032 | −0.0033 | −0.0033 |
| Lambourn Index: | 104 | 100 | 100 | 117 | 113 | 111 | 91 | 90 | 88 |
| LAMBOURN ABRASION RESISTANCE | | | | | | | | | |
| Average Slope (g/s): | −0.0035 | −0.0034 | −0.0034 | −0.0030 | −0.0030 | −0.0030 | −0.0033 | −0.0033 | −0.0034 |
| Lambourn Index: | 100 | 103 | 102 | 117 | 116 | 116 | 106 | 106 | 102 |
| STRAIN SWEEP (60° C., FINAL, ARES) | | | | | | | | | |
| G' (MPa) @ 5%, 10 Hz: | 2.2398 | 2.2717 | 2.1909 | 3.8235 | 3.9147 | 4.0411 | 2.4996 | 2.4894 | 2.5190 |
| G" (MPa) @ 5%, 10 Hz: | 0.3077 | 0.3197 | 0.3002 | 0.6125 | 0.5919 | 0.5978 | 0.2935 | 0.2985 | 0.2955 |
| tan δ @ 5%, 10 Hz: | 0.1374 | 0.1407 | 0.1370 | 0.1602 | 0.1512 | 0.1479 | 0.1174 | 0.1199 | 0.1173 |
| ΔG' (MPa) [0.25-14%], 10 Hz: | 1.0947 | 1.2001 | 1.0706 | 2.9392 | 2.7446 | 2.8145 | 0.7739 | 0.8269 | 0.8146 |
| REBOUND RESILIANCE | | | | | | | | | |
| Rebound (23 C.): | 34.6 | 34.8 | 33.8 | 37.8 | 37.6 | 36.8 | 38.4 | 38 | 38 |
| Rebound (50 C.): | 58.0 | 57.6 | 57.8 | 57.4 | 57.2 | 56.8 | 62.2 | 62.2 | 62.2 |
| SHORE A HARDNESS | | | | | | | | | |
| Mean at (23 C.): | 61.7 | 61.5 | 62.0 | 70.0 | 70.92 | 71.64 | 64.84 | 64.78 | 64.58 |
| CURE RHEOMETER (171° C.) | | | | | | | | | |
| ML (kg · cm): | 1.44 | 1.43 | 1.44 | 2.07 | 2.17 | 2.22 | 1.72 | 1.69 | 1.69 |
| MH (kg · cm): | 14.65 | 14.6 | 14.77 | 16.07 | 16.79 | 17.04 | 15.26 | 15.2 | 15.25 |
| t50 (min): | 2.65 | 2.68 | 2.73 | 6.82 | 6.6 | 6.4 | 2.53 | 2.72 | 2.75 |
| t90 (min): | 7.77 | 8.19 | 8.19 | 22.92 | 21.49 | 21.4 | 7.12 | 7.56 | 7.67 |
| MOONEY/SCORCH (130° C.) | | | | | | | | | |
| Final, ML1 + 4: | 86.7 | 86.8 | 86.7 | 121.4 | 122.3 | 124.5 | 110.2 | 110 | 110.8 |
| T80 (s): | 2.5 | 2.49 | 2.47 | 3.16 | 3.15 | 3.18 | 2.95 | 2.94 | 2.97 |
| TENSILE PROPERTIES (23° C.) | | | | | | | | | |
| Peak Stress (MPa): | 18.7 | 19.90 | 20.50 | 17.20 | 17.70 | 15.00 | 19.70 | 18.50 | 18.60 |
| 100% Modulus (MPa): | 1.968 | 1.96 | 1.99 | 2.43 | 2.68 | 2.82 | 2.31 | 2.46 | 2.40 |
| 300% Modulus (MPa): | 9.002 | 9.25 | 9.40 | 7.03 | 7.97 | 8.21 | 9.62 | 9.97 | 9.70 |

TABLE 9-continued

| | Example No. | | | | | | | | |
|---|---|---|---|---|---|---|---|---|---|
| | 25 | 26 | 27 | 28 | 29 | 30 | 31 | 32 | 33 |
| Elongation (%): | 522.205 | 542.58 | 553.20 | 653.57 | 625.69 | 522.21 | 532.89 | 497.28 | 504.14 |
| Toughness (MPa): | 42.617 | 47.12 | 49.68 | 53.54 | 54.09 | 39.10 | 46.81 | 41.89 | 42.02 |
| MACRO DISPERSION RATINGS | | | | | | | | | |
| ASTM Rating | 98.0 | 96.5 | 96.4 | 98.2 | 98.1 | 97.4 | 92.3 | 95.9 | 97.0 |

These results show improved performance over products like LIR 403, and show that zinc oxide is a key component. However, no additional benefit was obtained by increasing the amount of zinc oxide to 7 phr. The macro dispersion of filler was evaluated in these materials, and the Ricobond 1731-containing-stocks (Examples 28-30) showed the highest rating, using Transmission Electron Microscopy to image particle size and distribution. This corresponds to the best dispersion of filler over the control and the LIR-403-containing stocks Additionally, as can be seen in Table 9, the most noticeable improvements are that the test compounds show improved abrasion resistance as compared to the control specimens, especially after aging of the samples for 2 days at 100° C. There was as much as 17% improvement in the wear index by adding 6 phr of Ricobond™ into the formulation. These results are significantly better than the LIR 403 material, which did not show improvement at all in the un-aged stocks.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, *A Dictionary of Modern Legal Usage* 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus, and illustrative examples shown and described. Accordingly, departures may be made from such details without departing from the spirit or scope of the applicant's general inventive concept.

We claim:

1. A tread rubber composition having improved abrasion resistance, comprising:
    (a) a conjugated diene polymer or copolymer;
    (b) from 5 to 200 phr of at least one filler consisting of carbon black, fumed or precipitated silica, clay, metal oxide, metal hydroxide, metal sulfide, metal silicate, and metal carbonate;
    (c) from 2 to 10 phr of liquid polybutadiene;
    (d) from 0.2 to 5 phr of zinc oxide;
    (e) from 1 to 100 phr of process oil,
    wherein the liquid polybutadiene is functionalized by reaction with an unsaturated acid anhydride, has a number average molecular weight of from 3 to 8 kg/mol, and an acid number of from 40 to 180; and
    wherein the weight ratio of liquid polybutadiene to zinc oxide is greater than 1.1/1.

2. The tread rubber composition of claim 1, wherein the conjugated diene polymer or copolymer has a weight average molecular weight between 200 and 2,000 kg/mol, and a 1,2 vinyl microstructure content of from 10 to 90%.

3. The tread rubber composition of claim 1, comprising from 2 to 8 phr liquid polybutadiene.

4. The tread rubber composition of claim 1, wherein the weight ratio of liquid polybutadiene to zinc oxide is less than 10/3.

5. The tread rubber composition of claim 1, wherein the weight ratio of liquid polybutadiene to zinc oxide is between 8/3 and 1.1/1.

6. The tread rubber composition of claim 1, wherein the weight ratio of liquid polybutadiene to zinc oxide is between 2.5/1 and 1.1/1.

7. The tread rubber composition of claim 1, wherein the unsaturated acid anhydride randomly functionalizes the polymer chain of the liquid polybutadiene.

8. The tread rubber composition of claim 1, wherein the unsaturated acid anhydride is selected from the group consisting of itaconic acid anhydride, citraconic acid anhydride, maleic acid anhydride, and combinations thereof.

9. The tread rubber composition of claim 1, wherein the liquid polybutadiene is miscible with the conjugated diene polymer or copolymer.

10. The tread rubber composition of claim 1, wherein the conjugated diene polymer or copolymer is non-hydrogenated.

11. A method of preparing a tread rubber composition with improved abrasion resistance, the method comprising:
    (a) mixing a master batch comprising
        (i) a conjugated diene polymer or copolymer,
        (ii) from 5 to 200 phr of at least one filler consisting of carbon black, fumed or precipitated silica, clay, metal oxide, metal hydroxide, metal sulfide, metal silicate, and metal carbonate,
        (iii) from 2 to 10 phr liquid polybutadiene,
        (iv) from 0 to 5 phr zinc oxide,
        (v) from 1 to 100 phr of process oil, (b) mixing a final batch comprising
  (i) the master batch,
  (ii) at least one curative,
  (iii) from 0 to 5 phr zinc oxide, and
(c) vulcanizing the final batch,
wherein the total amount of zinc oxide is from 0.2 to 5 phr; and
wherein the liquid polybutadiene is functionalized by the reaction with an unsaturated acid anhydride, has a number average molecular weight of from 3 to 8 kg/mol, and an acid number of from 40 to 180; and
wherein the weight ratio of liquid polybutadiene to zinc oxide is greater than 1.1/1.

12. The method of claim 11, wherein the conjugated diene polymer or copolymer has a weight average molecular weight between 200 and 2,000 kg/mole, and a 1,2 vinyl microstructure content of from 10 to 90%.

13. The method of claim 11, wherein the master batch comprises from 2 to 8 phr liquid polybutadiene.

14. The method of claim 11, wherein the weight ratio of liquid polybutadiene to zinc oxide is less than 10/3.

15. The method of claim 11, wherein the weight ratio of liquid polybutadiene to zinc oxide is between 8/3 and 1.1/1.

16. The method of claim 11, wherein the weight ratio of liquid polybutadiene to zinc oxide is between 2.5/1 and 1.1/1.

17. The method of claim 11, wherein the unsaturated acid anhydride randomly functionalizes the polymer chain of the liquid polybutadiene.

18. The method of claim 11, wherein the unsaturated acid anhydride is selected from the group consisting of itaconic acid anhydride, citraconic acid anhydride, maleic acid anhydride, and combinations thereof.

19. The method of claim 11, wherein the liquid polybutadiene is miscible with the conjugated diene polymer or copolymer.

20. The method of claim 11, wherein the conjugated diene polymer or copolymer is non-hydrogenated.

* * * * *